US012762548B2

(12) United States Patent
Lobato et al.

(10) Patent No.: US 12,762,548 B2
(45) **Date of Patent: *Oct. 13, 2026**

(54) TOKEN PROCESSING FOR ACCESS INTERACTIONS

(71) Applicant: Visa International Service Association, San Francisco, CA (US)

(72) Inventors: Levi Lobato, Miguel Hidalgo Ciudad de Mexico (MX); Diego Norena, Miami, FL (US); Lee Araujo Martinez, Miguel Hidalgo Ciudad de Mexico (MX); Gabriel Hernandez, Miguel Hidalgo Ciudad de Mexico (MX)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/322,366

(22) Filed: Sep. 8, 2025

(65) Prior Publication Data

US 2026/0004283 A1 Jan. 1, 2026

Related U.S. Application Data

(63) Continuation of application No. 17/798,705, filed as application No. PCT/US2020/018773 on Feb. 19, 2020, now Pat. No. 12,437,289.

(51) Int. Cl.
*G06Q 20/38* (2012.01)

(52) U.S. Cl.
CPC ..... *G06Q 20/3821* (2013.01); *G06Q 20/3823* (2013.01); *G06Q 20/3829* (2013.01); *G06Q 20/389* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS 8,915,431 B2 * 12/2014 Chan ...................... G06Q 20/22 235/382
9,311,643 B2 * 4/2016 Dixon .................. G06Q 20/027
(Continued)

OTHER PUBLICATIONS

U.S. Appl. No. 17/798,705, "Corrected Notice of Allowability", Jul. 30, 2025, 2 pages.
(Continued)

*Primary Examiner* — Ari Shahabi
(74) *Attorney, Agent, or Firm* — Kilpatrick Townsend & Stockton LLP

(57) ABSTRACT

Systems and method of managing mass access transactions are disclosed. One method includes receiving, by an access operator computer from an access device of an access provider, a first transaction request with a credential and first transaction amount. The access operator computer identifies a token, based on the credential, and transmits a pre-authorization request message with the credential and a pre-authorization amount, then receives a pre-authorization response message. The access operator computer then receives, from the access device or another access device, a second transaction request for a second transaction, with the credential and a second transaction amount. The access operator computer identifies the token and determines that the token has been used at the access provider. Then, a total amount is formed by aggregating the first transaction amount and the second transaction amount, and the access operator computer initiates the transmission of a clearing message including the total amount.

20 Claims, 4 Drawing Sheets

(56) References Cited

U.S. PATENT DOCUMENTS

| | | | | |
|---|---|---|---|---|
| 9,978,094 | B2 * | 5/2018 | Gaddam | G06Q 30/0637 |
| 2015/0213443 | A1 * | 7/2015 | Geffon | G06Q 20/3821 705/76 |
| 2016/0036790 | A1 * | 2/2016 | Shastry | G06Q 20/32 713/168 |
| 2019/0080075 | A1 * | 3/2019 | Ekberg | H04L 63/10 |
| 2019/0384896 | A1 * | 12/2019 | Jones | G06F 21/31 |

OTHER PUBLICATIONS

U.S. Appl. No. 17/798,705 “Final Office Action”, Mar. 14, 2025, 28 pages.

U.S. Appl. No. 17/798,705, “Non-Final Office Action”, Nov. 20, 2024, 27 pages.

U.S. Appl. No. 17/798,705, “Notice of Allowance”, Jun. 12, 2025, 13 pages.

* cited by examiner

TOKEN PROCESSING FOR ACCESS INTERACTIONS

CROSS-REFERENCES TO RELATED APPLICATIONS

This application is a continuation application of U.S. application Ser. No. 17/798,705, filed on Aug. 10, 2020, which is a U.S. National Stage of PCT Application No. PCT/US2020/018773, filed Feb. 19, 2020, which are herein incorporated by reference in their entirety for all purposes.

BACKGROUND

In access situations, such as entering a building, event venue, or public transit, there is a need to process many access transactions quickly and efficiently, while maintaining security. Some transactions that take more than few seconds to process, or may require many messages. Such transactions can result in delays at access points such as transit terminals. There is a need to improve the speed of transactions without significantly increasing the complexity of existing access infrastructures. There is also a need to reduce the risk of allowing fraudulent access to unauthorized users and to reduce the risk of unauthorized use of access credentials.

Embodiments address these and other problems individually and collectively.

BRIEF SUMMARY

One embodiment comprises a method that includes receiving, by an access operator computer from an access device of an access provider, a first transaction request for a first transaction, the first transaction request comprising a credential, the first transaction request associated with a first transaction amount. The method also includes identifying, by the access operator computer, a token, based upon the credential. The method also includes transmitting, by the access operator computer to an authorizing computer, a pre-authorization request message comprising the credential and a preauthorization amount and receiving, by the access operator computer, a pre-authorization response message from the authorizing computer. The method also includes receiving, by the access operator computer from the access device or another access device, a second transaction request for a second transaction, the second transaction request comprising the credential, the second transaction request associated with a second transaction amount. The method also includes identifying, by the access operator computer, the token from the credential, determining, by the access operator computer, that the token has been used at the access provider. The method also includes forming a total amount by aggregating, by the access operator computer, at least the first transaction amount and the second transaction amount and initiating transmitting a clearing message including the total amount.

Another embodiment includes a server computer comprising a processor and a computer readable medium comprising code, executable by the processor, for performing a method that includes receiving, from an access device of an access provider, a first transaction request for a first transaction, the first transaction request comprising a credential, the first transaction request associated with a first transaction amount. The method also includes identifying a token, based upon the credential. The method also includes transmitting, to an authorizing computer, a pre-authorization request message comprising the credential and a preauthorization amount, and receiving a pre-authorization response message from the authorizing computer. The method also includes receiving, from the access device or another access device, a second transaction request for a second transaction, the second transaction request comprising the credential, the second transaction request associated with a second transaction amount and identifying the token from the credential. The method also includes determining that the token has been used at the access provider, forming a total amount by aggregating at least the first transaction amount and the second transaction amount, and initiating transmitting a clearing message including the total amount.

Another embodiment comprises a method that includes receiving, by an access device, a credential from a portable device and identifying, by the access device, a token based upon the credential. The method also includes determining, by the access device, that the token is not on a blacklist, admitting, by the access device, a user associated with the portable device, and transmitting, by the access device to an access operator computer, a transaction request comprising the credential, the transaction request associated with a transaction amount.

Another embodiment includes an access device comprising a processor and a computer readable medium comprising code, executable by the processor, for performing a method including receiving a credential from a portable device, and identifying a token based upon the credential. The method also includes determining that the token is not on a blacklist, admitting a user associated with the portable device, and transmitting, to an access operator computer, a transaction request comprising the credential, the transaction request associated with a transaction amount.

Further details regarding embodiments can be found in the Detailed Description and the Figures.

DETAILED DESCRIPTION

Figure 1:
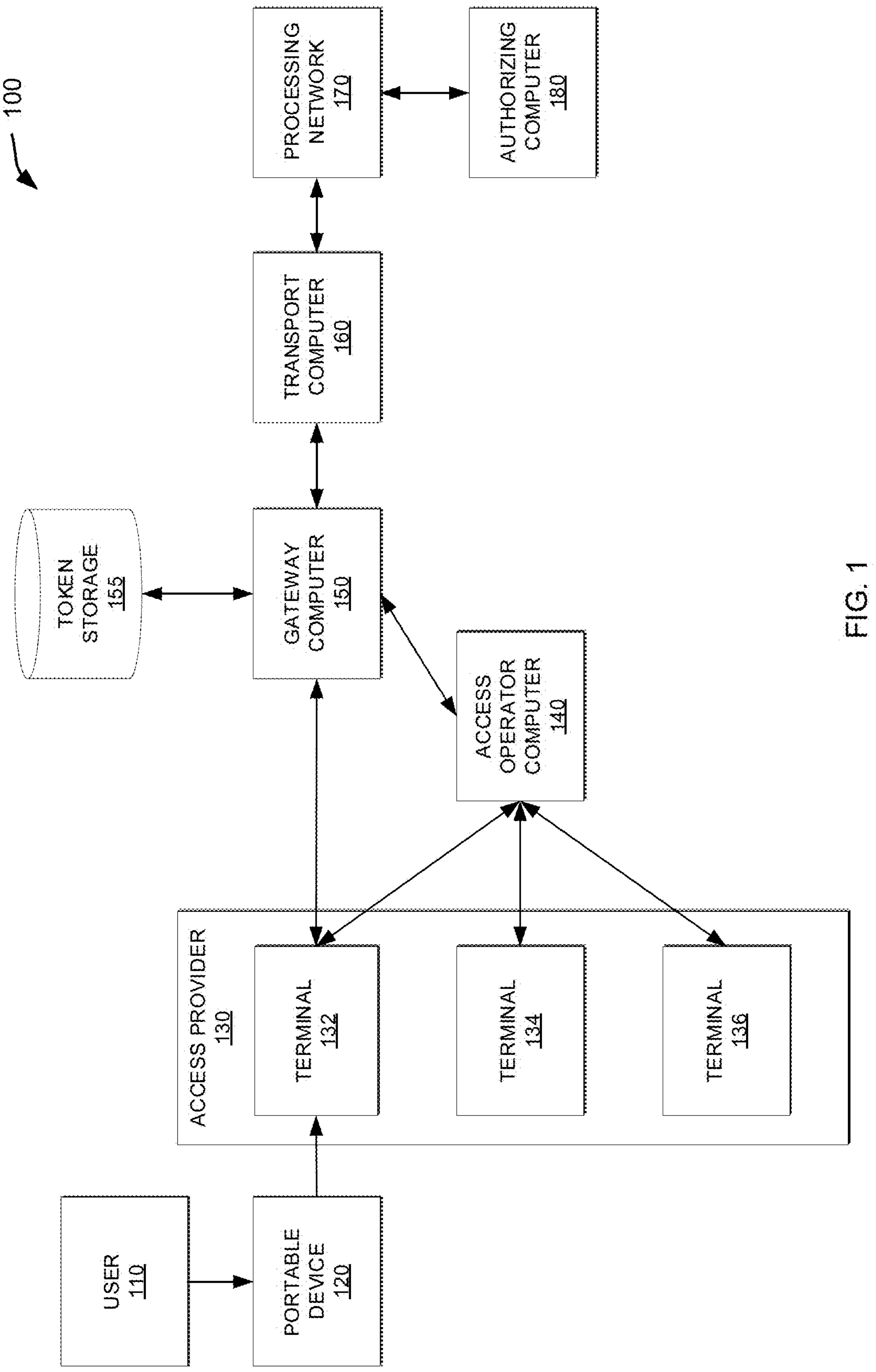
FIG. 1 is a block diagram of a system according to embodiments.

Prior to discussing embodiments, some terms can be described in further detail.

A "user" may include an individual or a computational device. In some embodiments, a user may be associated with one or more personal accounts and/or mobile devices. In some embodiments, the user may be a cardholder, account holder, or consumer.

A "portable device" may be a device that can be carried by a user. Portable devices may have capabilities for storing, processing, and communicating information. They may also store payment credentials. A portable device may have a way of generating and or storing cryptographic information for additional security. Examples of portable devices include laptops, mobile phones, payment cards, and key fobs.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "secure element" may be a microprocessor chip that can securely store and process data. A secure element can be used to perform cryptographic operations such as encryption and decryption. A secure element can have physical security measures to provide tamper resistance, and can protect the output of decrypted data. Examples of secure elements can include hardware security modules (HSMs) and Trusted Platform Modules (TPMs). Certain cryptographic information, such as secret keys and decryption algorithms, can be stored on a secure element.

A "public key" may include a cryptographic key that that forms a public key of a public/private key pair. The public key may be designed to be shared (e.g., transmitted between entities) and may be configured such that any information encrypted with the public key may only be decrypted using a private key associated with the public key.

A "secret key" or "private key" may include a cryptographic key that forms a private key of a public/private key pair. A private key may be used to decrypt data encrypted with a public key.

An "access operator" can manage access and provide access processing services for one or more service providers. An access operator may perform backend functions for different access providers. For example, an access operator may be a ticket processor that provides ticket processing services on behalf of many different transit agencies. The access operator may operate an "access operator computer".

An "access provider" can be an entity that provides access to a location. For example, an access provider can control access to a building, a subway system, an event venue, etc. A specific example of an access provider may be a transit agency, a building security department, etc. An access provider may control a plurality of access devices.

An "access device" may be any suitable device for providing access to an external computer system. An access device may be in any suitable form. Some examples of access devices include point of sale (POS) devices, cellular phones, PDAS, personal computers (PCs), tablet PCs, handheld specialized readers, set-top boxes, electronic cash registers (ECRs), automated fuel dispensers (AFDs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which sensitive data is replaced with substitute data. For example, a real credential (e.g., a primary account number (PAN)) may be tokenized by replacing the real account identifier with a substitute number that may be associated with the real credential. Further, tokenization can be applied to any other information to substitute the underlying information with a token. "Token exchange" or "de-tokenization" can be a process of restoring the data that was substituted during tokenization. For example, a token exchange may include replacing a payment token with its associated primary account number (PAN). Further, de-tokenization or token exchange may be applied to any other information to retrieve the substituted information from a token. In some embodiments, token exchange can be achieved via a transactional message, such as an ISO message, an application programming interface (API), or another type of web interface (e.g., web request).

A "token service computer" can include a system that that services tokens. In some embodiments, a token service computer can facilitate requesting, determining (e.g., generating) and/or issuing tokens, as well as maintaining an established mapping of tokens to primary account numbers (PANs) in a repository (e.g. token vault). In some embodiments, the token service computer may establish a token assurance level for a given token to indicate the confidence level of the token to PAN binding. The token service computer may include or be in communication with a token vault where the generated tokens are stored. The token service computer may support token processing of payment transactions submitted using tokens by de-tokenizing the token to obtain the actual PAN.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service computer that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile communication device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key). In some embodiments, the token request message may include a flag or other indicator specifying that the message is a token request message.

A "token response message" may be a message that responds to a token request. A token response message may include an indication that a token request was approved or denied. A token response message may also include a payment token, mobile communication device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key). In some embodiments, the token response message may include a flag or other indicator specifying that the message is a token response message.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorizing computer." Examples of an authorization entity may be an issuer, a governmental agency, a document repository, an access administrator, etc. An authorizing entity may also issue account parameters associated with the account to a client device. An authorizing entity may be associated with a host system that performs some or all of the functions of the issuer on behalf of the authorizing entity.

A "clearing message" can be a message that can include information needed for the actual exchange of funds between two entities. Clearing can be a process of exchanging transaction data between processors and issuers. In some cases, information in a clearing message may be used to calculate interchange fees. Clearing may be followed by settlement, where funds are transferred between parties. In some embodiments, clearing messages may be Base II messages.

A "payment processing network" may be a network that can process messages to facilitate payments. In some embodiments, a payment processing network can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week). The payment processing network may include a server computer. The payment processing network may use any suitable wired or wireless network, including the internet.

FIG. 1 shows a block diagram of a system 100 according to embodiments. System 100 can include a user 110 with a portable device 120. System 100 may also include an access provider 130, which may operate a plurality of access terminals 132, 134, 136. The portable device 120 may interact with an access terminal (e.g., 132) to gain access to a secure location (e.g., a train) provided by the access provider 130. The access provider 130 and the access terminals 132, 134, 136 may be in operative communication with an access operator computer 140 and a gateway computer 150. The gateway computer 150 may have access to a token storage 155 and may be in communication with an authorizing computer 180 via a transport computer 160 and a processing network 170. Any of the devices of system 100 may be in operative communication via any suitable number of types of communication networks or communication channels.

An exemplary communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The parties may communicate with each other and the ledgers via secure and authenticated communication channels.

User 110 may be a user of an access system, such as a rider or patron of a transit system. The user 110 may have a portable device 120 that can be used to gain access to a secure location. In some embodiments, the portable device 120 can be hand-held and compact so that it can fit into a user's wallet and/or pocket (e.g., pocket sized). Examples of portable device 120 may include cellular phones, personal digital assistants (PDAs), smartphones, payment cards, payroll cards, security cards, access cards, smart media, transponders, and the like. Portable device 120 may interface with terminal 132 or other suitable type of access device using any suitable mechanism including any suitable electrical, magnetic, or optical interfacing system. The portable device 120 may also store credentials such as payment credentials. For example, the portable device 120 may be a payment card such as a credit card and the user 110 may be able to enter a secured area by using the payment card to pay for access.

Access provider 130 can be an entity that provides access to a secure area. For example, access provider 130 may control access to a subway system. As another example, access provider 130 can control access to a concert venue, an amusement park, or a government building. Access provider may operate a plurality of terminals. The terminals may be in one or more locations. For example, the terminals may be at a number of subway stations or may be in front of the entrance to a building.

Terminals 132, 134, and 136 may each be an example of an access device. The terminals 132, 134, 136 may include a physical access control element such as a turnstile or a gate. In some embodiments, a terminal may be a controlled-access door. The terminal may have a reader to receive information from portable device 120. For example, it may have a swipe reader or contactless interface. The terminal may have a gate or some other kind of physical barrier that can prevent a the user 110 from entering a secure location before the user 110 is authorized to do so.

Access operator computer 140 may provide access processing services to one or more access providers 130. For example, access operator computer 140 may manage transit operations for a plurality of city's public transit services.

Gateway computer 150 may be a computer that provides access to a payment processing system. Examples of tasks performed by gateway computer 150 may include processing access transactions, detecting fraud, and managing transaction data security. In some embodiments, gateway computer 150 may provide an interface between resource providers (e.g., access provider 130, access operator computer 140), and transport computer 160 or processing network 170. Gateway computer 150 may also be in communication with a token storage 155. Token storage 155 may store credentials and tokens associated with the credentials.

Transport computer 160 may be a computer that routes information between the gateway computer 150 and the processing network 170. In some embodiments, the transport computer 160 may be operated by an acquirer of access provider 130 or access operator computer 140. Transport computer 160 may also reformat received messages to an appropriate format (e.g., reformatting a message from gateway computer 150 to ISO 8583 before sending to processing network 170).

Processing network 170 may be a payment processing network. Examples of a payment processing network can include VisaNet. Processing network 170 may route messages and facilitate transactions between other entities connected to the processing network 170. Messages may include authorization messages, clearing messages, and settlement messages. In some embodiments, processing network 170 may also process pre-authorization messages.

Authorizing computer 180 may authorize and process transactions. Authorizing computer 180 may provide an account number or other credentials associated with the user 110 that may be used to initiate payment transactions at access devices other than the terminals (e.g., with merchants that provide goods and services, without providing access to a transit system or sports venue, etc.). In some embodiments, authorizing computer 180 may be an issuer of user 110.

Figure 2:
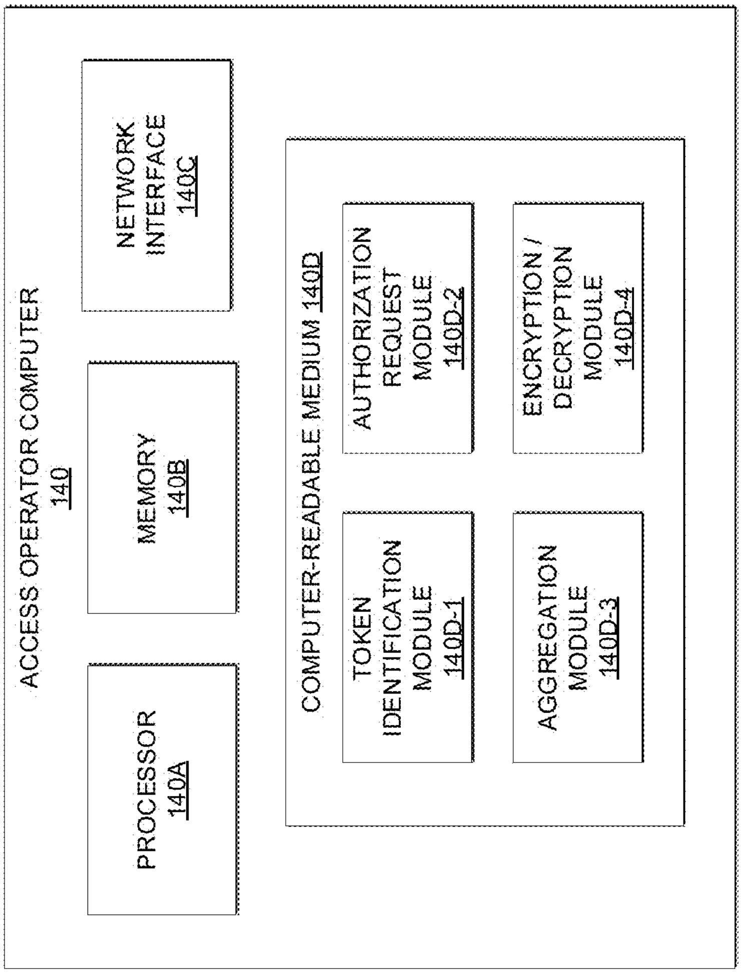
FIG. 2 is a block diagram of a transit operator according to embodiments.

FIG. 2 is a block diagram of an access operator computer 140 according to embodiments. Access operator computer 140 may comprise a processor 140A that is in operative communication with a memory 140B, a network interface 140C, and a non-transitory computer-readable medium 140D. The computer-readable medium may comprise a token identification module 140D-1, an authorization request module 140D-2, an aggregation module 140D-3, and an encryption/decryption module 140D-4.

Processor 140A may be implemented as one or more integrated circuits (e.g., one or more single core or multicore microprocessors and/or microcontrollers). The processor 140A may be used to control the operation of the access operator computer 140. The processor 140A can execute a variety of programs in response to program code or computer-readable code stored in memory 140B. The processor 140A may include functionality to maintain multiple concurrently executing programs or processes.

The memory 140B may be implemented using any combination of any number of non-volatile memories (e.g., flash memory) and volatile memories (e.g., DRAM, SRAM), or any other non-transitory storage medium, or a combination of media.

Network interface 140C may be configured to connect to one or more communication networks to allow access operator computer 140 to communicate with other entities such as terminal 132, gateway computer 150, etc. For example, communication with terminal 132 can be direct, indirect, and/or via an API.

Computer-readable medium 140D may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 140D may be any combination of such storage or transmission devices.

The computer readable medium 158 may comprise any suitable number of software modules. The software modules illustrated in FIG. 2 may include a token identification module 140D-1, an authorization request module 140D-2, an aggregation module 140D-3, and an encryption/decryption module 140D-4.

Token identification module 140D-1, in conjunction with the processor 140A, can identify tokens based on credentials. In some embodiments, identifying a token may comprise querying a token storage 155 with the credential to identify the associated token. In other embodiments, identifying the token may comprise generating the token with a cryptographic function, such as by hashing the credential. For example, the token may be generated by hashing the credentials. In other embodiments, identifying the associated token may include obtaining a pre-generated token. The pre-generated token may be mapped to the credential in a data table in the token storage 155. The token identification module 140D-1, in conjunction with the processor 140A, may also determine if the token that is stored in the token storage 155 is valid. In this regard, conditions for token use (e.g., circumstances, times, dates, etc.) may be stored in a data table along with the credential that is associated with the token. For example, a token in the token storage 155 may only be valid for one day. The times (e.g., 12 am to 12 am the following day) that the token is valid may be stored in the token storage 155 with the token.

Authorization request module 140D-2, in conjunction with the processor 140A, can generate and send authorization request messages. The authorization request messages can be sent to processing network 170 (e.g., through transport computer 160). In some embodiments, the authorization request message can be a pre-authorization request message. In some embodiments, the authorization request message can be an ISO 8583 message.

Aggregation module 140D-3, in conjunction with the processor 140A, can aggregate transaction amounts. In some embodiments, aggregation module 140D-3 can form the total amount from a plurality of transaction amount at one time (e.g., when a clearing message is generated). For example, aggregation module 140D-3, in conjunction with the processor 140A, can query a transaction log for all transactions performed by a user then combine the individual transaction amounts. In other embodiments, aggregation module 140D-3 can aggregate each new transaction amount for a user to maintain a running total. Aggregation module 140D-3 can perform other calculations to determine a total amount from transaction amounts, such as discounts or other adjustments (e.g., a cap on the price, discounted fare after a certain time, etc.)

Encryption/decryption module 140D-4, in conjunction with the processor 140A, can encrypt and/or decrypt information. For example, encryption/decryption module 140D-4 may receive credentials that have been encrypted with a public key, and may then use an associated secret or private key to decrypt the encrypted credentials. Additionally, encryption/decryption module 140D-4, in conjunction with the processor 140A, can use a symmetric key to encrypt data. Additionally, encryption/decryption module 140D-4 may verify encrypted data (e.g., with a public key) and ensure that the encrypted data (e.g., signed data) has not been tampered with.

In some embodiments, the computer-readable medium 140D may comprise code, executable by the processor 140A, to perform a method comprising: receiving, from an access device of an access provider, a first transaction request for a first transaction, the first transaction request comprising a credential, the first transaction request associated with a first transaction amount; identifying a token, based upon the credential; transmitting, to an authorizing computer, a pre-authorization request message comprising the credential and a pre-authorization amount; receiving a pre-authorization response message from the authorizing computer; receiving, from the access device or another access device, a second transaction request for a second transaction, the second transaction request comprising the credential, the second transaction request associated with a second transaction amount; identifying the token from the credential; determining that the token has been used at the access provider; forming a total amount by aggregating at least the first transaction amount and the second transaction amount; and initiating transmitting a clearing message including the total amount.

Figure 3:
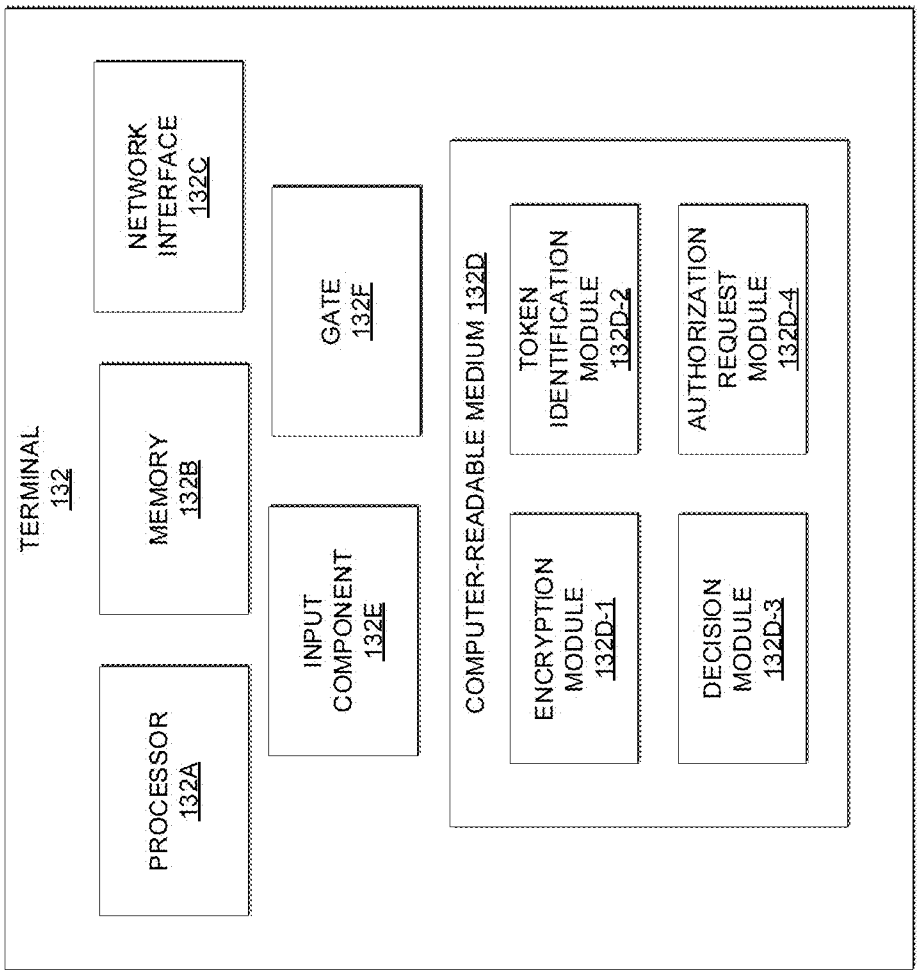
FIG. 3 is a block diagram of a terminal according to embodiments.

FIG. 3 shows a block diagram of a terminal 132 according to embodiments. Similar diagrams may apply to terminal 134 and terminal 136, or other terminals operated by access provider 130. Terminal 132 may comprise a processor 132A that is in operative communication with a memory 132B, a network interface 132C, an input component 132E, a gate 132F, and a non-transitory computer-readable medium 132D. Computer-readable medium 132D may comprise an encryption module 132D-1, a token identification module 132D-2, a decision module 132D-3, and an authorization request module 132D-4. Terminal 132 may also comprise a secure element (not pictured). The processor 132A, memory 132B, network interface 132C, and the computer readable medium 132D may have the same or different characteristics as the processor 140A, the memory 140B, the network interface 140C, and the computer readable medium 158 in the access operator computer 140 illustrated in FIG. 2. The descriptions of those components can be incorporated herein.

Input component 132E may interface with a portable device to receive information from the portable device. Input component 132E may be a magnetic stripe reader, an NFC reader, optical reader, contactless elements, or other device that can receive data. In some embodiments, the input component 132E may be a contact or contactless reader that can read data from a portable device through a short-range contactless communication medium.

Gate 132F may be a physical structure such as a bar or turnstile, door, or other physical barrier that can prevent unauthorized access to a secure location such as a train terminal. In some cases, the gate 132F may physically block a user from entering a controlled area. In some embodiments, the gate 132F may be a light, speaker, or other signal emitter that can inform a user that the user is or is not allowed to enter a secure location. For example, gate 132F may be an LED that can be red when access is denied and that can be green when access is permitted.

The computer readable medium 132D may comprise any suitable number of software modules. In FIG. 3, an encryption module 132D-1, a token identification module 132D-2, a decision module 132D-3, and an authorization request module 132D-4 may be on the computer readable medium 132D.

Encryption module 132D-1, in conjunction with the processor 132A, may encrypt data. For example, encryption module 132D-1 may encrypt credentials received from a portable device, such as payment credentials. The encryption module 132D-1 may comprise or be in communication with a secure element to perform the encryption. The encryption may be done with a cryptographic key that is injected into the terminal 132 and stored in the secure element. The key may be injected when the terminal 132 is being constructed.

Token identification module 132D-2 may be substantially similar to or different than the token identification module 158A of FIG. 2, and the token identification module 132D-2 and the processor 132A can perform similar or different functions than the token identification module 140D-1 and the processor 140A.

Decision module 132D-3, in conjunction with the processor 132A, may determine whether a user should be allowed access. The decision module 132D-3, in conjunction with the processor 132A, may check determine if a token is on a blacklist. If a token that is associated with a user is on a blacklist, then the user is denied access to the secure location by the terminal 132. The blacklist may be stored in the memory 132B. The decision module 132D-3 can also use a credential received by the input component 132E to query the blacklist. If the decision module 132D-3, in conjunction with the processor 132A, determines that the user should be denied entry to a secure location, the decision module 132D-3 and the processor 132A can send a notification to the gate 132F to prevent the user from entering. If the decision module 132D-3 and the processor 132A determine that the user is allowed access to the secure location, the decision module 132D-3 can send a notification to the gate 132F to allow the user access to the secure location.

Authorization request module 132D-4, in conjunction with the processor 132A, can send authorization request messages. The authorization request message may be a transaction request. This module can be similar to the authorization request module 158B in FIG. 2. The authorization request module 132D-4 and the processor 132A in the terminal 132 in FIG. 3 can perform similar or different functions as the authorization request module 140D-2 and the processor 140A in the access operator computer 140 in FIG. 2.

The computer-readable medium 132D may also comprise code executable by the processor 132A for performing a method comprising: receiving a credential from a portable device; identifying a token based upon the credential, determining that the token is not on a blacklist; admitting a user associated with the portable device; and transmitting, to an access operator computer, a transaction request comprising the credential, the transaction request associated with a transaction amount.

Figure 4:
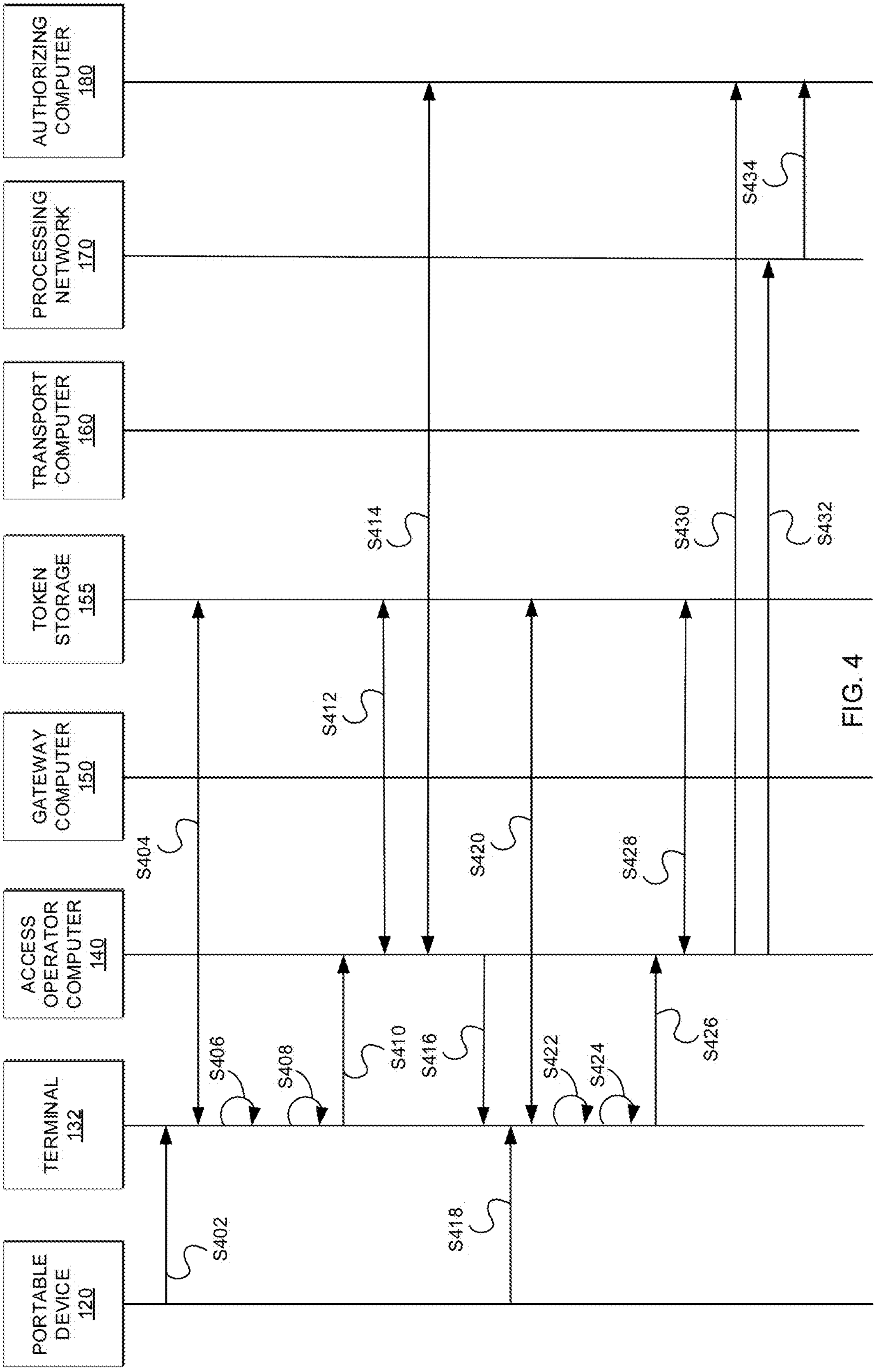
FIG. 4 is a swim lane diagram of a message according to embodiments.

FIG. 4 shows a swim lane diagram of a process according to embodiments. FIG. 4 illustrates a process in which a user (not shown in FIG. 4) uses a portable device 120 to access a secure location such as a transit system at two different points in time.

In step S402, a user (not shown in FIG. 4) can tap their portable device 120 to terminal 132 at a first time during a particular day. The terminal 132 may be a transit terminal such as an access gate at a train station. For example, the user may tap a transit payment card, a credit card, or their mobile phone to a contact point on the terminal 132. As another example, the user may swipe a transit card through a magnetic stripe reader on the terminal 132. The terminal 132 can receive a credential from the portable device 120, such as a PAN. The terminal 132 may also receive additional information such as a CVV (card verification value). The credential may be associated with an account such as a payment account or a transit account.

In step S404, the terminal 132 can identify a token based upon the credential. In some embodiments, identifying the token may comprise generating the token with a cryptographic function, such as by hashing. In other embodiments, the terminal 132 can retrieve the token from the token storage 155. The token may be a unique string of characters or numbers. In some embodiments, the token may be a payment token.

In some embodiments, after identifying the token, the terminal 132 may send the token to the token storage 155 with an identifier of the credentials to map the credentials to the token. The identifier for the credentials may be the credentials themselves, or it may be data derived from the credential (e.g., a hashed or encrypted credential). If it is the latter, the real credential may be converted to data derived from the credential each time the user uses the portable device 120 at a terminal of the access provider. This can be advantageous since sensitive data is not stored in the token storage 155.

In step S406, the terminal 132 can determine if the identified token is or is not on a blacklist. The blacklist may be stored on the terminal 132, and may be updated periodically (e.g., every 20 minutes with information from external sources, such as the access operator computer 140) as information about problematic tokens becomes available. For example, a user's token may be on a blacklist because their account did not have sufficient funds for a prior or current transaction or the account associated with the token was not valid for some reason. The terminal 132 may also determine if the credential is or is not on the blacklist. If the current transaction is the first transaction of the day conducted by the user, then a token for user may not be on the blacklist, but the user's credential could be on the blacklist.

In step S408, the terminal 132 can allow the user associated with the portable device 120 to access the secure location if the token is not on the blacklist. For example, the terminal 132 can admit the user by raising a barrier or unlocking a door. Alternatively, the terminal 132 can also admit the user by producing an audio or visual indication that the user is authorized to proceed to the secure location (e.g., by producing a green light). If the terminal 132 determines that the token is on the blacklist, then the terminal 132 can prevent the user from entering the secure location. The terminal 132 can do so by not moving a physical barrier such as a turnstile or by emitting a signal (e.g., a red light) indicating that the user cannot proceed to the secure location. In some embodiments, if this is the user's first transaction of the day (or any other periodic time period), the blacklist determination may be the only criteria used to decide if the user can access the secure location.

In step S410, the terminal 132 can transmit to an access operator computer 140, a transaction request comprising at least the credential obtained from the portable device 120, and optionally a transaction amount and other data (e.g., a time stamp, a transaction identifier, etc.). For example, the transaction amount may be a transit fare or venue entrance fee. In some embodiments, the transaction amount may be associated with the transaction request, but may not be contained within the transaction request. For example, all transactions originating at terminal 132 may be for a flat fee of $2.50 so a transaction amount need not be in the transaction request.

In this example, the transaction request may be a first transaction request, and prior to sending the credential to the access operator computer 140, the terminal 132 can encrypt the credential. In some embodiments, the credential may be encrypted with a cryptographic key stored on a secure element of the terminal 132. In some embodiments, the transaction request also comprises the token if the transaction request is not an initial transaction request for the user.

In step S412, the access operator computer 140 can identify a token based upon the credential. In some embodiments, the token may be in the transaction request. In other embodiments, the access operator computer 140 may generate the token with the credential (e.g., by hashing the credentials). In yet other embodiments, the access operator computer 140 can retrieve the token from the token storage 155. In such embodiments, the access operator computer 140 may use the credential to query the token storage 155, then receive the token in response.

In step S414, after identifying the token, the access operator computer 140 can transmit a pre-authorization request message to the authorizing computer 180 for approval. The pre-authorization request message can be used to determine if the credential is valid. The pre-authorization request message may not necessarily be used to pre-authorize a transaction amount for the transaction as is normally done for pre-authorization requests. In some embodiments, the pre-authorization request may comprise the credential and a preauthorization amount. In some embodiments, the pre-authorization amount may be a small amount that is less than the transaction amount (e.g., less than one dollar). In some embodiments, the pre-authorization amount may be 0 dollars. The pre-authorization request message may also include a pre-authorization identifier that can identify the pre-authorization request that is being made.

In some embodiments, the authorizing computer 180 may be operated by an issuer of an account of the user. The access operator computer 140 may then receive a pre-authorization response message from the authorizing computer 180. The pre-authorization response message may indicate whether the account is valid. For example, if the pre-authorization fails, even for a nominal pre-authorization amount, this may indicate that the user's account is invalid or fraudulent.

Pre-authorization may fail for a number of reasons. For example, the credential may be evaluated by the authorizing computer 180 and may be determined to be invalid or on an issuer blacklist (e.g., due to excessive fraudulent use).

After the access operator computer receives the pre-authorization response, the access operator computer 140 may store the information from the pre-authorization request (or any authorization request, or pre-authorization response) in a transaction log. Each entry in the transaction log (which may in the form of a data table) may comprise one or more of the pre-authorization identifier, the token, a time and date of the transaction, an identifier of the terminal 132, an identifier of the access provider, the pre-authorization amount, and/or the transaction amount. The transaction log may also store the approval or disapproval indicator, or any other suitable data, from the pre-authorization response message. In some embodiments, the access operator computer 140 may discard the plaintext credentials, and may also discard any encrypted credentials.

In step S416, if the pre-authorization response message is negative (including a decline), the access operator computer 140 may add the token (and optionally the credential) to the blacklist and send the updated blacklist to the terminal 132. The updated blacklist may be sent to all terminals operated by the access provider. In some embodiments, the updated blacklist may be sent to terminals operated by multiple access providers (e.g., a bus system and a subway system in the same city). In some embodiments, the updated blacklist may be sent to the terminal 132 after the user has been admitted. In these embodiments, the user may be admitted to the secure location even if they do not have a valid account.

In some embodiments, the terminal 132 can then receive a second credential from a second portable device associated with a second user. The terminal 132 can then identify a second token based on the second credential, by a similar process as step S412. The terminal 132 may determine that the second token is on the blacklist and deny access to the second user associated with the second portable device.

In step S418, the portable device 120 may be used to initiate a second transaction. For example, the user may use the portable device 120 to access a secure location provided by the access agency at a second time during the day. In some embodiments, the portable device 120 may be used at the same terminal 132 (e.g., if there is only one access point at a venue). In other embodiments, the personal device may be used at a different terminal (e.g., at a subway turnstile at a different station from the first transaction). In the second transaction, the terminal 132 may receive the credential from the portable device 120.

Steps S420-S424 may be similar to steps S404-S408, are incorporated herein, and need not be repeated here.

In step S426, the access operator computer 140 can receive a second transaction request for a second transaction from the terminal 132. The second transaction request can comprise the credential and a second transaction amount. In some embodiments, the second transaction amount may be associated with the second transaction request but not contained within the second transaction request. The second transaction amount may or may not be equal to the first transaction amount. In some embodiments, the second transaction request may also include the token. In some embodiments, the terminal 132 may encrypt the credential and/or the token prior to sending it to the access operator computer 140. In some embodiments, the credential and/or token may be encrypted with a cryptographic key stored on a secure element of the terminal 132.

In step S428, the access operator computer 140 can identify the token from the credential. In some embodiments, the token may be in the transaction request and the access operator computer 140 can identify the token by analyzing the transaction request message. In other embodiments, the access operator computer 140 may generate the token with the credential (e.g., by hashing the credentials). Alternatively, the access operator computer 140 can retrieve the token from token storage 155. The access operator computer 140 may use the credential to query the token storage 155, then receive the token in response. As noted above, in some cases, the credential may be hashed or encrypted, and the token may be retrieved using the hashed or encrypted credential.

The access operator computer 140 can then determine whether the token has been used at the access provider. In some embodiments, the access operator computer 140 can determine whether the token has been used that day. Determining whether the token has been used may comprise searching the transaction log. If the access operator computer 140 stores a transaction log entry including the token for that day, then the token has been used.

If the token has been used, the access operator computer 140 may not send a pre-authorization message to the authorizing computer 180. The token, a time and date of the second transaction, an identifier of the terminal 132, an identifier of the access provider, and/or the second transaction amount associated with the second transaction can be added to the transaction log by the access operator computer 140. In some embodiments, the first transaction request in the transaction log can be updated with information from the second transaction request.

If the token is currently in a valid state and there is nothing that would prevent the user from accessing the secure location, then the user of the portable device 120 may be allowed to access the secure location, even though no pre-authorization request is sent to the authorizing computer 180 and even though no authorization request message is sent to the authorizing computer 180.

At this point, the user of the portable device 120 may continue to enter the secure location provided by the access agency for any other number of times. The limit on the number of times may be restricted by time (e.g., one day). In this case, the token stored for the credential may need to be refreshed and the process needs to start from the beginning (e.g., at step S402) at the start of the new time period (e.g., the next day).

In step S430, in some embodiments, after the requisite period of time has elapsed (e.g., 1 day) or after the allowed number of transactions is conducted by the user of the portable device 120, the access operator computer 140 can generate and submit a single authorization request message to the authorizing computer 180 (e.g., via the transport computer 160 and the processing network 170) to request authorization for the total amount of all transactions conducted by the user during the predetermined period of time. The authorization request message may comprise a total amount of the transactions, the pre-authorization request identifier, and optionally, the token. The pre-authorization request identifier may also have sufficient information to identify the authorizing computer 180. For example, the pre-authorization request identifier may comprise an identifier (e.g., a bank identification number) for the authorizing computer 160.

The access operator computer 140 can form the total amount by aggregating at least the first transaction amount and the second transaction amount. This may be done periodically, such as once per day before sending clearing messages. Alternatively, the total amount may be aggregated every few hours to maintain a running total. When forming the total amount, other factors may affect the total amount in addition to the first transaction amount and the second transaction amount. For example, there may be a daily cap on the total amount (e.g., subway trips are free after spending $10 in one day) or a volume discount (e.g., a 10% discount on all rides after taking 5 or more trips). In order to aggregate the total amount, the access operator computer 140 can retrieve at least the data associated with the first transaction and the second transaction from the transaction log.

The authorizing computer 180 can use the pre-authorization identifier to retrieve the pre-authorization request message and the credential (e.g., real PAN) associated with the pre-authorization request message stored during the pre-authorization process, such as by extracting the credential from the pre-authorization request message.

The authorizing computer 180 can then use the total amount and credentials to complete the transaction. For example, the credential can be used to determine the user's account and to determine if there are sufficient funds and credit in the user's account to pay for the total amount.

In step S432, in addition to or instead of the authorization request message described above with respect to step S430, the access operator computer 140 can initiate the transmission of a clearing message. For example, the access operator computer 140 can transmit a clearing message or communicate with the transport computer 160 associated with the access operator operating the access operator computer 140 to cause the transmission of a clearing message including the total amount and the pre-authorization identifier to the processing network 170. The clearing message may then be received by the processing network 170, which may in turn communicate with the authorizing computer 180 in step S434. The authorizing computer 180 can use the pre-authorization identifier to retrieve the pre-authorization request message and the credential (e.g., real PAN) associated with the pre-authorization request message stored during the pre-authorization process, such as by extracting the credential from the pre-authorization request message.

The authorizing computer 180 can then use the total amount and credentials to complete the transaction. For example, the credential can be used to determine the user's account and to determine if there are sufficient funds and credit in the user's account to pay for the total amount.

The authorizing computer 180 may also verify that a clearing message has not already been received with the pre-authorization identifier to prevent double charging. If the authorizing computer 180 cannot locate a pre-authorization request message, the authorizing computer 180 may return an error message or a decline to the access operator computer 140. Authorizing computer 180 may also return an error message or decline if it is unable to complete the transaction (e.g., invalid account, insufficient funds). If the access operator computer 140 receives an error message or a decline, the access operator computer 140 may add the credentials and/or tokens associated with the credentials to the blacklist and send the updated blacklist to terminal 132 and all other terminals.

After step S432, the processing network 170 can initiate a transfer of funds from the authorizing computer 180 to the transport computer 160 which holds the account of the access operator operating the access operator computer 140.

The access operator computer 140 may periodically attempt to complete the outstanding transactions of tokens on the blacklist. For example, once per day, the access operator computer 140 can generate a clearing message for a token on the blacklist along with the outstanding total amount and the pre-authorization identifier, and transmit it as in step S432. This clearing message may be for a recurring transaction, repeating the attempt to finish the transaction until the access operator computer 140 receives a successful transaction response message. If the access operator computer 140 receives an approval response, the access operator computer 140 can remove the token from the blacklist.

Additionally, or alternatively, a user can have themselves removed from the blacklist. For example, the user can go onto a website associated with the access operator computer or access provider. The user can log in (e.g., by entering a username and password, by entering their credentials) and view failed transactions. After logging in, the user may then be able to address any failed transactions. For example, the user can update their credential to a valid account or enter an alternate credential for paying the outstanding debt. The site can then generate a debt recovery message including the credential and send it to the access operator computer. After receiving the debt recovery message, the access operator computer can retrieve (and/or generate) the total amount and transmit the total amount to the website. The website can then generate a debt recovery request comprising the updated credential and the total amount and send it to the authorizing computer. The debt recovery message may be sent through the access operator computer, the payment gateway and/or the processing network.

The data associated with the debt recovery message may also be used to generate a clearing message. The website can then receive a debt recovery response from the authorizing computer, indicating whether or not the transaction was successfully completed. After receiving an approval response from the site, the access operator computer can remove the credential and associated token from the blacklist, then send the updated blacklist to the terminals.

Embodiments of the invention provide a number of advantages. Embodiments can protect sensitive credential information (e.g., secure access credentials, transit credentials, payment credentials) using a combination of security mechanisms. Credentials can be encrypted when they are transmitted between terminals and access operators, or transmitted over secure channels to a processing network. Plaintext credentials need not be stored at the terminal or access operator computer, reducing the risk that a hacker gain access to a large database of sensitive data. Additionally, embodiments can be implemented without requiring significant changes to an existing infrastructure. A city's transit system may have hundreds of turnstiles and needing to update each and the existing transit infrastructure may be prohibitive Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

receiving, by an access device of an access provider from a payment device of a user, a credential during an interaction, wherein the access device is a first transit terminal comprising a first physical barrier adapted to prevent users from unauthorized access to a transit system;

cryptographically altering, by the access device, the credential to form a token;

determining, by the access device, if the token is on a blacklist stored at the access device;

determining, by the access device, that the token is not on the blacklist;

in response to determining that the token is not on the blacklist, moving the first physical barrier;

receiving, by an access operator computer from the access device, a first transaction request for a first transaction, the first transaction request comprising the credential, the first transaction request associated with a first transaction amount;

identifying, by the access operator computer, the token, based upon the credential in the first transaction request;

transmitting, by the access operator computer to an authorizing computer, a pre-authorization request message comprising the credential and a pre-authorization amount;

receiving, by the access operator computer, a pre-authorization response message from the authorizing computer;

receiving, by the access device or another access device, the credential from the payment device in a subsequent interaction, cryptographically altering, by the access device or the another access device, the credential to form the token in the subsequent interaction, wherein the another access device is a second transit terminal comprising a second physical barrier adapted to prevent users from unauthorized access to the transit system;

determining if the token formed in the subsequent interaction is on the blacklist on the access device or another blacklist stored at the another access device;

receiving, by the access operator computer from the access device or the another access device, a second transaction request for a second transaction, the second transaction request comprising the credential, the second transaction request associated with a second transaction amount;

identifying, by the access operator computer, the token from the credential in the second transaction request;

determining, by the access operator computer, that the token in the second transaction request has been used at the access provider;

forming a total amount by aggregating, by the access operator computer, at least the first transaction amount and the second transaction amount; and initiating transmitting a clearing message including the total amount.

2. The method of claim 1, wherein the pre-authorization response message is a decline and wherein the method further comprises:

transmitting, by the access operator computer, the pre-authorization response message to the access device.

3. The method of claim 2, further comprising:

adding, by the access operator computer, the token to the blacklist to form an updated blacklist; and sending, by the access operator computer, the updated blacklist to the access device.

4. The method of claim 3, further comprising:

receiving, by the access operator computer, an approval response; and removing, by the access operator computer, the token from the blacklist.

5. The method of claim 3, further comprising:

receiving, by the access operator computer from a site, a debt recovery message including the credential;

retrieving, by the access operator computer, the total amount, transmitting, by the access operator computer to the site, the total amount, wherein the site generates a debt recovery request comprising the credential and the total amount;

receiving, by the access operator computer from the site, a debt recovery response; and removing, by the access operator computer, the token from the updated blacklist.

6. The method of claim 1, wherein the first transaction request comprises the token and wherein identifying the token comprises extracting the token from the first transaction request.

7. The method of claim 1, wherein the pre-authorization request message comprises a pre-authorization identifier, wherein the clearing message also includes the pre-authorization identifier, and wherein the authorizing computer uses the pre-authorization identifier to retrieve the credential.

8. The method of claim 1, further comprising:

periodically sending, by the access operator computer, an updated blacklist to a plurality of access devices including the access device.

9. The method of claim 1, further comprising:

periodically sending, by the access operator computer, a clearing message for each token on the blacklist on the access operator computer.

10. The method of claim 9, wherein the clearing message is for a recurring transaction.

11. A system comprising:

an access device of an access provider, the access device comprising a first memory, and a first processor, comprising first code on the first memory executable by the first processor to receive, from a payment device, a credential during an interaction, wherein the access device is a first transit terminal comprising a first physical barrier adapted to prevent users from unauthorized access to a transit system, cryptographically alter the credential to form a token, determine if the token is on a blacklist stored at the access device, determine that the token is not on the blacklist, and in response to determining that the token is not on the blacklist, moving the first physical barrier; and a server computer comprising, a second memory, a second processor comprising second code on the second memory executable by the second processor to receive, from the access device, a first transaction request for a first transaction, the first transaction request comprising the credential, the first transaction request associated with a first transaction amount, identify the token, based upon the credential in the first transaction request, transmit, to an authorizing computer, a pre-authorization request message comprising the credential and a pre-authorization amount, receive a pre-authorization response message from the authorizing computer, receive, from the access device or another access device, a second transaction request for a second transaction, the second transaction request comprising the credential, the second transaction request associated with a second transaction amount, wherein the another access device is a second transit terminal comprising a second physical barrier adapted to prevent users from unauthorized access to the transit system, identify the token from the credential in the second transaction request, determine that the token in the second transaction request has been used at the access provider, form a total amount by aggregating at least the first transaction amount and the second transaction amount, and initiate transmitting a clearing message including the total amount.

12. The system of claim 11, wherein the second code is further executable by the second processor to store the first transaction request without the credential in a transaction log.

13. The system of claim 12, wherein the second code is further executable by the second processor to update the first transaction request in the transaction log with the second transaction request.

14. The system of claim 12, wherein the second code is further executable by the second processor to query the transaction log with the credential.

15. The system of claim 11, wherein the second code is further executable by the second processor to retrieve the token from a token storage.

16. The system of claim 11, wherein the first transaction request comprises the token and wherein the second code is further executable by the second processor to identify the token based on the credential in the first transaction request.

17. The system of claim 11, wherein the second code is further executable by the second processor to apply a cryptographic function to the credential.

18. The system of claim 11, wherein the token is valid for one day.

19. The system of claim 11, wherein the credential is encrypted.

20. The system of claim 11, wherein the pre-authorization amount is zero dollars.

* * * * *